United States Patent Office 2,875,037
Patented Feb. 24, 1959

2,875,037

METHOD OF MAKING BESSEMER OR CONVERTER STEEL

Edwin C. Wright, University, Ala., assignor to Pennsylvania Engineering Corporation, New Castle, Pa., a corporation of Pennsylvania No Drawing. Application March 17, 1953
Serial No. 342,970

4 Claims. (Cl. 75—46)

This application is a continuation-in-part of my co-pending application Serial No. 107,754, filed July 30, 1949, now abandoned.

This invention relates to a method of producing steel by the so-called Bessemer or converter process.

An object of this invention is to produce a new and improved Bessemer process which is capable of producing high quality steel, i. e., steel equal in quality to the best steel made by open hearth and electric furnace procedures.

In accomplishing this object I employ a two step procedure. One in which silicon, manganese and a part of the carbon contained in the bath of molten pig iron is reduced in an acid lined converter by a bottom blow, and the other in which the phosphorus and also the carbon remaining in the molten bath are reduced in a basic lined converter by a side blow. I, however, depart from all old procedures by reducing the temperature of the bath after the bottom blow from about 1750–1850° C. to a temperature of about 1420° C. as a preliminary to initiating the side blow in the basic lined converter. This reduction in temperature is preferably accomplished at the end of the first step by adding sufficient steel scrap to the molten bath in the acid lined converter and preferably before the slag on the bath has been removed. After the bath is so cooled and the slag is removed therefrom, the molten metal is delivered to a side blow basic lined converter in which the phosphorus content of the bath and the carbon remaining in the bath are reduced.

Around 1884, several installations were made which involved the use of two Bessemer converters. One of these was in France and the other in Luxembourg. In each of these installations, the first stage converter was acid lined, while the second stage converter was basic lined. In these installations, both converters were side blown and each was relatively small, being of about two tons capacity. These early experimental installations are referred to in a paper entitled "The Development of the Bessemer Process for Small Charges" found on page 846 of the Transactions of American Institute of Mining Engineers, 1903, vol. XXXIII, but they have left no impress on the commercial art.

For many years the Bessemer method of making steel in acid lined Bessemer converters led all other methods in this country. At the present time, however, the amount of Bessemer steel made in this country is not more than about 5% of the total steel produced; approximately 95% being made by other methods or processes which are much slower and much more expensive.

The terms "side blown" or "side blowing" and "bottom blown" or "bottom blowing" as used herein refer to the manner in which the air is introduced to the bath of molten pig iron. Bottom blowing or bottom blown means that the air blast passes through the molten metal within the converter. It is generally introduced through the bottom of the converter, but in a tilting converter, it may be introduced through one side of the converter but under conditions such that when the converter is tilted it passes upwardly through the molten metal. Side blowing or side blown means that the air is introduced above the surface of the molten metal in the converter, impinges on the surface thereof, but does not pass through the metal.

I have discovered that I can make Bessemer steel which is extremely low in nitrogen (.005%) and of a quality equal to any made by the basic open hearth method, in relatively large converters (for example 30 tons capacity or more) from molten pig iron which is either high or low in phosphorus.

No one prior to my invention has succeeded in making low nitrogen, low phosphorous Bessemer steel. Low nitrogen Bessemer steel has been produced by side blowing in an acid lined converter. Low phosphorus Bessemer steel has been produced by bottom blowing in a basic lined converter, but no one has produced a commercially practical procedure for making Bessemer steel which is low in both nitrogen and phosphorus. Phosphorus cannot be removed in an acid lined converter. It may be oxidized by bottom blowing in a basic lined converter if the amount of phosphorus in the molten bath exceeds 1.50% and if the silicon content is below 0.75%, and sufficient lime is added to the slag to hold the phosphorus. If, however, the silica content of the slag is high, as for example, from pig iron having over 1.00% silicon, removal of phosphorus is very erratic. Low silicon, high phosphorus pig iron is available in England but is not available in the United States and this is necessary for carrying out a Bessemer procedure such as is used in England in producing low phosphorus, high nitrogen steel, but steel which will not meet many of the American steel specifications.

I am able to produce high grade steel of the extremely low nitrogen content mentioned (less than 0.005%), in commercial quantities and under commercial operating conditions, by employing a two stage or duplex procedure. As previously stated, I utilize a bottom blow acid lined converter in removing the silicon and manganese and a part of the carbon from molten pig iron. I then employ a side blow basic lined converter for reducing the phosphorus and the remaining carbon and for thereby completing the production of high quality Bessemer steel.

In carrying forward this procedure it is important to use a bottom blow acid lined converter for the first stage and a basic lined side blow converter for the second stage. It is also vitally important to materially reduce the temperature of the bath of molten metal between the two stages of the procedure. Such a temperature control is necessary because of the heat produced during the side blow of the second stage. The temperature of the bath rises rapidly during the bottom blow of the first stage. In order to prevent rapid disintegration of the lining of the converter employed, it is desirable to prevent the temperature of the bath from greatly exceeding 1600° C.

During the first stage the temperature is controlled, at least to some extent, by the passage through the bath of the large volume of the nitrogen content of the air employed during the bottom blow. Then too, during the bottom blow the combustion of the carbon produces carbon monoxide gas, whereas during the side blow the resulting combustion produces carbon dioxide gas, with the result that the heat generated in the side blow converter occasions an extremely rapid increase in the temperature of the bath and it is, therefore, necessary to provide a temperature control effective during the side blow in order to produce the low nitrogen, low phosphorus steel such as is here contemplated and at the same time prevent rapid disintegration of the converter lining. In this connection it is noted that when a pound of carbon burns to CO it develops 4,374 B. t. u.'s, while in a side blow converter the burning of a pound of carbon to $CO_2$ develops 14,580 B. t. u.'s, approximately three times the heat developed in producing CO gas in the first stage or the bottom blow converter.

I have found that it is a simple matter to remove the silicon and manganese in from about 2 to 4 minutes by blowing air through the molten metal in an acid lined (silicious) bottom blown converter. At this point, very little carbon, if any, has been removed and no phosphorus. The silicon combustion produces a large amount of heat and the bath therefore becomes extremely hot. I however, reduce the temperature of the bath by adding a calculated amount of cold steel scrap thereto as a preliminary to the second stage operation.

When the bath has been brought to the desired temperature, it may be separated from the slag (high manganese acid slag) and transferred to a basic lined (magnesia) converter and side blown to lower the phosphorus and carbon contents to the desired level without reaching the undesirable high temperatures usually encountered in single stage side blowing operations.

The adding of the cold scrap to the bath for the purpose of reducing the temperature thereof is preferably accomplished prior to removing the acid slag from the bath in the acid lined converter. By proceeding in this way the highly fluid slag is cooled and rendered more viscous, thus facilitating the operation of from completely removing is from the bath prior to proceeding with the second stage operation.

By employing adequate quantities of burned lime as slag-producing material during the second stage operation, a limey slag with a phosphorus content is produced which is a valuable fertilizer. It is composed almost entirely of iron-calcium phosphate. Appreciable quantities of $SiO_2$ in the slag will absorb calcium oxide and thus inhibit the formation of the stable calcium phosphates. This, however, is only one reason for completely removing the acid slag from the bath prior to initiating the second stage operation.

By my two stage or duplex Bessemer process, I am able to produce a finished steel with all impurities removed and having a nitrogen content of less than 0.005%. The steel as finally produced can be used for making dead soft, deep-drawing sheets and plates or it may be recarburized and treated with the necessary deoxidizers such as silicon, aluminum, titanium, manganese, etc., to make a finished steel of the desired alloy content for good forging quality steel.

Probably the simplest deoxidizing procedure is that disclosed in my Patent 2,218,458, issued October 15, 1940. That is, by adding molten pig iron containing 4% carbon to the molten steel in a suitable ladle in the ratio of about 30 to 40 pounds of molten pig iron per 1000 pounds of molten steel. The molten pig iron is poured into the molten steel in the ladle and initially raises its carbon content to over 0.20%. This causes a vigorous reaction, the carbon combining with the oxygen in the steel and escaping, presumably, as CO gas. This reaction is allowed to proceed to practical completion at which time the carbon content of the molten metal in the ladle drops to from approximately 0.20% to about 0.12% while the FeO content of the steel is lowered to about 0.15% or less.

The two stage operation of this invention has several important advantages over any previous procedure or method employed in making Bessemer steel, viz., the concentration of available manganese which may be recovered from the slag produced in the first stage, that is, in the acid lined converter; the concentration of phosphorus to a salable form and the production of very low nitrogen steel equal in quality to any open hearth steel.

The following is an example of the operating cycle of my two stage Bessemer process or method in which 30 tons (60,000#) of hot metal is processed in two thirty ton converters. The data sheet accompanying this specification brings out the heat balance of the process; the effect the cold scrap addition (between the bottom blow and the side blow) has on the temperature control; the concentration of the manganese and phosphorus into two separate and usable slags and the composition of the final finished steel. In addition Table I of such sheet shows the manner in which manganese may be concentrated into slags of very high manganese content by using pig irons of different manganese content which is readily accomplished by the addition of low grade manganese ores to the blast furnace charges.

In the example given, the hot pig iron contained the following impurities: Carbon 4.00%; silicon 1.00%; manganese 0.60%; phosphorus 0.25%.

In blowing this hot metal in an acid lined converter supplied with 25,000 cubic feet of air per minute it was found that the following reactions took place after three minutes of blowing:

Air supplied 75,000 cubic feet or 6060 pounds containing 1395 pounds of oxygen.
600# of silicon uses 686# oxygen to produce 1286# of silicon dioxide.
360# of manganese uses 105# oxygen to produce 465# of manganese oxide.
350# of iron uses 100# oxygen to produce 450# of ferrous oxide.
378# carbon uses 504# of oxygen to produce 882# of carbon monoxide.
Total oxygen consumed 1395#.
Total slag produced 2201# containing 58.5% silica; 21.1% MnO; 20.5% FeO.

If the manganese content of the pig iron is raised to 2% or 4% the composition of the slag produced in three to four minutes in the bottom blown acid lined converter is shown in Table I. It will be evident that slags of very high manganese may readily be made by this practice. Such slags are suitable for the recovery of manganese in accordance with the teachings of my application Serial No. 327,748, filed December 24, 1952. Since about 15# of manganese is necessary for the satisfactory production of one ton of steel ingots, the importance of this manganese recovery will be obvious. Up to the present time more manganese has been wastefully discarded on steel mill slag dumps than has been required to produce steel.

The heat balance of this three or four minute blowing operation may be readily measured or calculated by well known principles of thermal chemistry. Since the silicon generates the largest amount of heat per pound of element oxidized, it is fortunate that this heat can be generated during the first stage of my process and then corrected before transferring the metal to the side blown basic lined converter in which the second stage is carried out.

In this first stage the heat developed by the chemical reactions and the heat absorbed by the products formed are shown below:

|  | B. t. u. |
|---|---|
| 600# silicon oxidized to silica | 7,730,000 |
| 360# manganese to MnO | 1,140,000 |
| 350# iron to FeO | 725,000 |
| 378# carbon to CO | 3,320,000 |
| Total heat generated in reactions | 12,915,000 |
| Heat absorbed in heating gases to 1600° C | 4,314,720 |
| Net heat available to heat metal | 8,600,280 |
| Heat in metal charged at 1450° C | 30,348,000 |
| Total heat available | 38,948,280 |
| Heat in 2201 pounds of slag | 2,000,000 |
| Heat lost by radiation | 550,000 |
| Final heat available to raising bath | 36,398,280 |

From this the theoretical temperature of the molten metal bath after the first three minutes of blowing may be calculated as 1815° C. This is too hot to be used in the side blowing operation and it is necessary to cool the metal by the addition of cold scrap iron or steel. 15,000 pounds of steel scrap will absorb about 10,000,000 B. t. u. in being heated to 1700° C. If this is added to the 60,000 pounds originally charged a resulting bath of about 75,000 pounds of molten metal will be obtained with a total heat content of 36,398,280 B. t. u. The calculated temperature is then 1420° C. which is just about the desired initial temperature for successful side blowing. The molten bath as cooled is transferred to a basic lined side blown vessel and blown until the carbon flame disappears, at which time the phosphorus and carbon will be reduced to below 0.04%. Sufficient burned lime is charged before the side blowing is started to combine with the known quantity of phosphorus to hold this impurity in the slag. The carbon content of the metal before side blowing is 2.74% and the phosphorus content is 0.20% after dilution by the cold scrap addition.

If 25,000 cubic feet of air per minute is supplied to the side blow converter, it will require 12.5 minutes to furnish the oxygen necessary for the oxidation of the 2052# of carbon, 150# of phosphorus and 500# of iron which will be oxidized in this final side blowing stage. The heat generated by these reaction will be 19,985,500 B. t. u. while the radiation losses and sensible heat of the gases will absorb 14,844,160 B. t. u. This will cause a net gain of 5,141,340 B. t. u. which will bring the temperature of the finished bath to 1640° C. This is a very desirable temperature for casting steel ingots.

It will be seen from this example that a suitable means of regulating the temperature of the bath is available at each stage by varying the scrap added to take up the excess heat developed in the initial stage which is carried out in an acid lined converter.

It is believed that there will always be a need for approximately 25% cold iron or steel scrap addition to the bottom blown metal before the final stage of side blowing. This amount is just about the normal amount of "home" scrap that every steel plant produces in rolling its own ingots. In this sense my two stage Bessemer process is balanced as to raw materials as the plant would not have to buy outside scrap to make steel nor would it have a surplus of scrap to be disposed of to outside customers.

The extent of the phosphorus concentration in the second stage is shown in Table II. Here the amount of calcium phosphate formed from pig iron charges of various phosphorus content is disclosed. There will always be some dilution of this slag from the MgO (magnesia) of the basic lining of the converter in this side blown stage.

My process is not limited to the use of 30 ton capacity converters such as are referred to in describing the embodiment of my invention. There is no reason why much larger converters cannot be used in the processing of much larger batches of molten pig iron, and it will be apparent that my invention provides an economical and highly effective method of making Bessemer steel which has an exceedingly low nitrogen content (.005%) and a low oxygen content (.003%) and is of a quality equal to any steel made by the basic open hearth process. It is also apparent that my novel method not only produces Bessemer steel of superior quality, but also produces two valuable slags, i. e., an iron, manganese, silica slag and an iron, calcium phosphate slag, one of which is suitable for use in the recovery of manganese, while the other is a limey slag of high phosphorus content substantially free of silica, and, as previously noted, highly valuable as a fertilizer.

The life of the linings of the converters used in carrying out my novel Bessemer process will be greatly increased over the life of either the acid or basic lined Bessemer converters now in use and of equal tonnage, and the process results in an economically produced high quality steel and the two slags, each of which is commercially valuable.

TABLE I

*Slag composition with pig irons of various manganese contents*

| Mn in Pig Iron, percent | Silicon in Pig Iron, percent | MnO after Blow, pounds | $SiO_2$ after Blow, pounds | FeO after Blow, pounds | Total Slag Weight, pounds | Time of Blow |
|---|---|---|---|---|---|---|
| 0.60 | 1.00 | 465 | 1,286 | 450 | 2,201 | 3 Minute Blow. |
| 2.00 | 1.00 | 1,549 | 1,286 | 514 | 3,349 | 3.5 Minute Blow. |
| 4.00 | 1.00 | 3,098 | 1,285 | 771 | 5,155 | 4 Minute Blow. |

Figures based on blowing 60,000 pounds of pig iron at times indicated using 25,000 cubic feet of air per minute.

TABLE II

*Slag composition with pig irons of various phosphorus contents*

| Phosphorus in Pig Iron, percent | $P_2O_5$ Formed Side Blow Stage, pounds | CaO Needed For Slag, pounds | Calcium Phosphate Formed, pounds | Time of Blow for About 3% C |
|---|---|---|---|---|
| 0.25 | 345 | 397 | 742 | About 20 Minutes. |
| 0.50 | 690 | 794 | 1,484 | About 23 Minutes. |
| 1.00 | 1,380 | 1,588 | 2,968 | About 30 Minutes. |

Figures based on blowing 60,000 pounds of pig iron at times indicated using 25,000 cubic feet of air per minute.

What I claim is:

1. A method of making Bessemer steel having a nitrogen content of not more than 0.005% and a phosphorus content of less than 0.04%, which consists in blowing with air a bath of molten pig iron in an acid lined converter until substantially all the silicon and manganese of the bath is oxidized and the carbon content of the bath is reduced to not more than 3%; reducing the temperature of the bath and of the slag contained thereon to about 1500° C. by adding to the bath through the slag a calculated quantity of cold iron and steel scrap; removing the thus partially cooled slag from the bath; transferring the slag-free molten metal from the acid lined converter to a basic lined converter; covering the bath in the basic lined converter with basic slag-forming material; side blowing the bath in the basic lined converter to further reduce the carbon content thereof and to the extent that phosphorus content is reduced below 0.04%; and then in separating the resultant slag from the finished steel constituting the molten bath.

2. A method of making Bessemer steel having a nitrogen content of not more than 0.005% and a phosphorus content of not more than 0.04% and two types of commercially valuable slags, which consists in delivering a bath of molten pig iron to an acid (silica) lined converter; bottom blowing such bath in such converter with air to the extent that substantially all the silicon and manganese thereof is oxidized and the carbon content thereof is reduced to not more than 3%; cooling the bath and the supernatant slag after such blow by delivering a calculated amount of cold ferrous metal scrap thereto; removing the iron-manganese-silicate slag from the surface of the bath after such cooling and delivering the cooled, slag-free metal to a basic lined converter; covering the surface of the molten metal bath in such basic lined converter with basic slag-forming material containing calcium oxide; then side blowing the bath in said basic lined converter to further reduce the carbon content thereof and to the extent that the phosphorus content of the bath is reduced to at least 0.04%; and then removing the phosphate containing calcium slag from the bath.

3. A method of making Bessemer steel containing not more than 0.005% nitrogen and less than 0.04% phosphorus while producing two commercially valuable slags, which consists in delivering a bath of molten pig iron to an acid (silica) lined converter; bottom blowing such bath with air to the extent of removing substantially all the silicon and manganese content thereof and of reducing the carbon content to not more than 3%; cooling the metal bath and the slag formed thereon to a temperature of approximately 1420° C. by delivering a sufficient quantity of cold ferrous metal thereto through such slag; removing the thus cooled iron-manganese-silicate slag from the bath; delivering the slag-free molten metal bath to a basic lined converter; covering the surface of such bath in such converter with calcium oxide; then side blowing the bath with sufficient air to reduce the carbon content thereof to not more than 0.04% and the phosphorus content to not more than 0.04%; then removing the phosphate-containing calcium slag from the bath.

4. A method of making Bessemer steel containing not more than 0.005% nitrogen and less than 0.04% phosphorus while producing two commercially valuable slags, which consists in delivering a bath of molten pig iron to an acid (silica) lined converter; blowing such bath to the extent of removing substantially all the silicon and manganese content thereof and of partially reducing the carbon content thereof; cooling the metal bath and the slag formed thereon to a temperature of approximately 1420° C. by delivering a sufficient quantity of cold ferrous metal thereto through such slag to accomplish such cooling; separating the thus cooled slag from the bath; delivering the slag-free molten metal bath to a basic lined converter; covering the surface of such bath in such converter with basic slag-forming material; then side blowing the bath to the extent that both the carbon content and the phosphorus content thereof is reduced to not more than 0.04%; then separating the slag from the bath.

References Cited in the file of this patent
UNITED STATES PATENTS

| | | |
|---|---|---|
| 217,962 | Thomas | July 29, 1879 |
| 278,732 | Reese | June 5, 1883 |
| 287,842 | McDonald | Nov. 6, 1883 |
| 695,256 | White | Mar. 11, 1902 |
| 2,207,309 | Work | July 9, 1940 |
| 2,218,458 | Wright | Oct. 15, 1940 |
| 2,390,346 | Bayer | Dec. 4, 1945 |
| 2,490,990 | Work | Dec. 13, 1949 |
| 2,501,832 | Story | Mar. 28, 1950 |

FOREIGN PATENTS

| | | |
|---|---|---|
| 591 of 1879 | Great Britain | Feb. 14, 1879 |
| 1,683 of 1879 | Great Britain | Apr. 29, 1879 |
| 18,016 of 1911 | Great Britain | May 30, 1912 |

OTHER REFERENCES

Journal of The Iron and Steel Institute, vol. 157, page 114.

Journal of The Iron and Steel Institute, vol. CL (1944), pages 339p–358p. Only page 340 is relied on.